United States Patent Office 3,074,799
Patented Jan. 22, 1963

3,074,799
POLISHING COMPOSITION

Edward R. Kendall, Chicago, Ill., assignor to Simoniz Company, a corporation of Delaware
No Drawing. Filed Aug. 9, 1960, Ser. No. 48,358
3 Claims. (Cl. 106—10)

This invention relates to a polishing composition.

It has long been known to produce polishes for automobiles, furniture and the like in paste form comprising essentially wax or a mixture of waxes dissolved partially in a solvent or mixture of solvents to produce the paste. Among the desirable characteristics of such a paste wax is its appearance. Thus, it has been found most desirable to produce the polish of this type in a solid cake that resists deformation when pressure is applied to it such as with the thumb. The consistency of the wax is such that it resists penetration of the thumb yet under sufficient presure will yield.

This results in a cake in which the polishing composition can be picked up in sufficient quantity on a moist cloth such as a cotton cloth without resulting in excess quantities being picked up on the cloth. Furthermore, a cake of this type retains these characteristics until substantially all the cake has been used up. Among the waxes used in such polishing compositions is carnauba wax. As carnauba is a natural wax it tends to vary in composition from batch to batch so that the characteristics of the resulting polishing composition cake will also vary. No way has been found to measure the characteristics of a natural wax such as carnauba so that it can be predicted how it will work in a cake polishing composition. Thus, many batches of carnauba will produce a cake with adequate physical characteristics while other batches with the same appearance will produce a cake that is soft, grainy and mushy and having completely undesirable characteristics.

It has been discovered that this problem can be overcome by incorporating in the carnauba containing polishing composition a microcrystalline wax, and preferably an oxidized microcrystalline wax, in a minor amount. This microcrystalline wax serves to upgrade the final product so that even when using an inferior carnauba wax, so far as physical characteristics of the resultant cake are concerned, a satisfactory cake can be produced. Thus, even when using a carnauba wax that produces a soft, grainy and mushy cake the addition of a relatively small amount of microcrystalline wax will result in a firm, smooth cake having the above desired characteristics.

One of the features of this invention therefore is to provide an improved smooth and uniform cake polishing composition comprising carnauba wax and microcrystalline wax and a solvent.

Other features and advantages of the invention will be apparent from the following description thereof.

The polishing composition of this invention comprises about 15.2% of carnauba wax, about 0.25–5.0% of microcrystalline wax, and preferably oxidized microcrystalline wax, about 9–13% by weight of paraffin wax and the remainder to 100% of a hydrocarbon solvent for these waxes. This amount of solvent will preferably be between 67–77% by weight. Preferably a mixture of hydrocarbon solvents is used. In all instances herein percentages and amounts are by weight.

The preferred oxidized microcrystalline wax is "Petronauba C." It has a minimum melting point of 180° F. (A.S.T.M. D–127–49), a maximum penetration at 77° F. with a 100 gram weight of 7 (A.S.T.M. D–1321–54T), an acid number of 22/28, a saponification number of 50/60, and a maximum viscosity S.S.U. at 210° F. of 130.

The preferred paraffin wax where such is used is Eskar Wax R–35. It has an A.P.I. gravity of 41.8, a flash point of 420° F., a viscosity at 210° F. of 38.8 and a penetration of 15.

As mentioned above, the preferred amount of solvent is from 67–77%. The amount of solvent may be varied within these ranges to provide the desired consistency of the composition and the desired drying rate, all is understood by those skilled in the art. The solvent acts as a carrier and is preferably a hydrocarbon. Among the suitable solvents are mineral spirit solvents such as "Amsco 460 solvent" and "Oleum Spirits". Solvents of a kauri-butanol number of between about 20–105 are most preferred, with the optimum solvent being one with a number of about 35. However, under no circumstances are solvents to be used which are deleterious to the finish of the surface or which are drying oils.

In one example of a polishing composition of this invention the composition contained:

| | Percent by weight |
|---|---|
| Carnauba wax | 15.2 |
| Petronauba C wax | 1.0 |
| Eskar wax R–35 | 11.8 |
| Amsco 460 solvent | 18.3 |
| Oleum Spirits solvent | 53.7 |

In producing the polishing composition all of the Amsco and about one-half of the Oleum solvents were added to a large kettle and the carnauba and Petronauba C added. The mixture was heated to 210° F. and stirred until dissolved. The paraffin wax was added at this temperature and stirred until it had dissolved and this served to lower the temperature to about 180° F. The remainder of the Oleum Spirits at room temperature (preferably 70° F.) was then added and the mixture cooled slowly by permitting it to stand. When the composition reached 145–150° F. it was poured into containers and permitted to cool to room temperature whereupon the formation of a firm cake in the containers was accomplished.

Having described by invention as related to the embodiment set out herein, it is my intention that the invention be not limited by any of the details of description, unless otherwise specified, but rather be construed broadly within its spirit and scope as set out in the accompanying claims.

I claim:

1. A polishing composition in cake form, consisting essentially of: about 15.2% of carnauba wax; about 0.25–5.0% of microcrystalline wax having a minimum melting point of about 180° F., a maximum penetration of about 7 at 77° F. with a weight of 100 grams, an acid number of about 22–28 and a saponification number of about 50–60; about 9–13% paraffin wax having a minimum melting point of about 130–132° F.; and about 67–77% of a mineral spirits hydrocarbon solvent for said waxes, said waxes being in proportions within the above percentage ranges to produce a solid cake that resists pressure deformation.

2. A polishing composition in cake form, consisting essentially of: about 15.2% of carnauba wax; about 1% of microcrystalline wax having a minimum melting point of about 180° F., a maximum penetration of about 7 at 77° F. with a weight of 100 grams, an acid number of about 22–28 and a saponification number of about 50–60; about 11.8% paraffin wax having a minimum melting point of about 130–132° F.; and about 72.0% of a mineral spirits hydrocarbon solvent for said waxes, said waxes being in proportions within the above percentage ranges to produce a solid cake that resists pressure deformation.

3. A polishing composition in cake form, consisting essentially of: about 15.2% of carnauba wax; about 1% of oxidized microcrystalline wax having a minimum melting point of about 180° F., a maximum penetration of about 7 at 77° F. with a weight of 100 grams, an acid number of about 22–28 and a saponification number of about 50–60; about 11.8% paraffin wax having a minimum melting point of about 130–132° F.; and about 72.0% of a hydrocarbon solvent for said waxes, said solvent having a kauri-butanol number of between about 20–105 and said waxes being in proportions to produce a solid cake that resists pressure deformation.

References Cited in the file of this patent

UNITED STATES PATENTS 2,561,816   Pabst _____ July 24, 1951